H. J. AUGUSTINE.
SPRING TIRE.
APPLICATION FILED MAY 9, 1914.
1,117,472.
Patented Nov. 17, 1914.
2 SHEETS—SHEET 1.
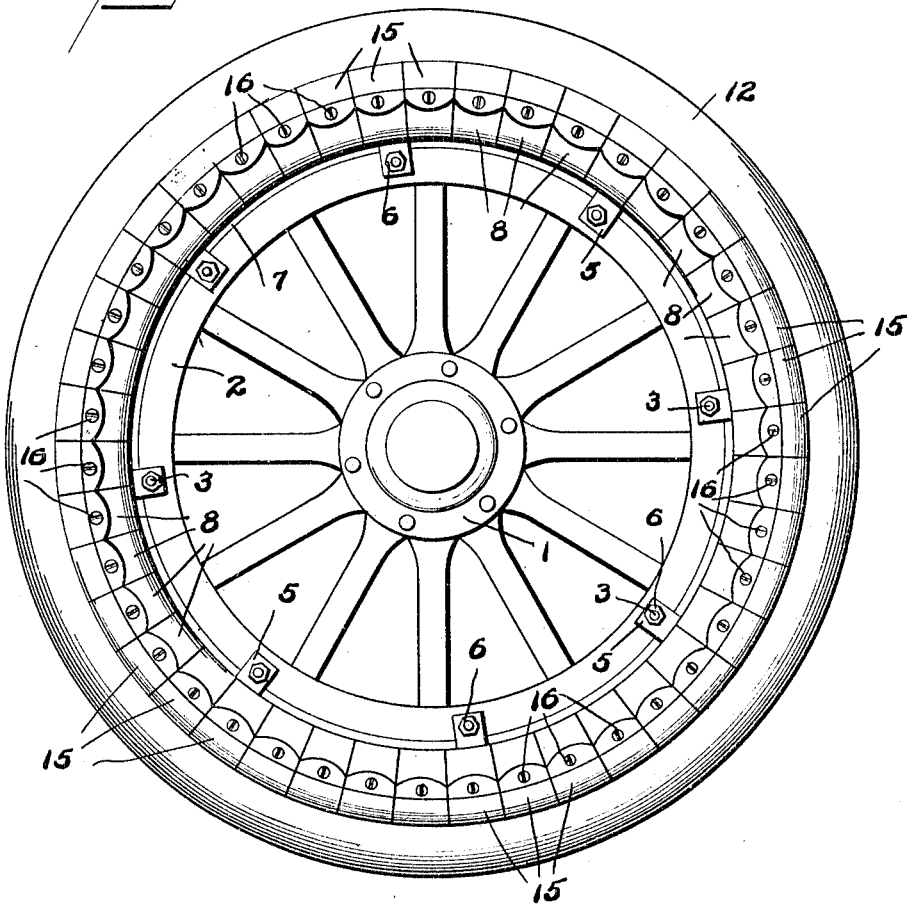
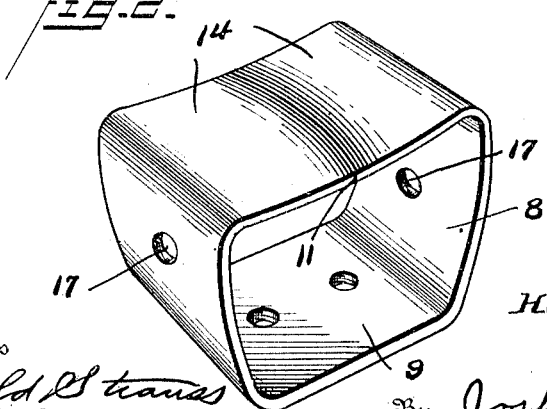
Inventor
Henry J. Augustine
By Joshua R. H. Potts.
Attorney
Witnesses
Harold Strauss
C. R. Ziegler.

H. J. AUGUSTINE.
SPRING TIRE.
APPLICATION FILED MAY 9, 1914.
1,117,472.
Patented Nov. 17, 1914.
2 SHEETS—SHEET 2.
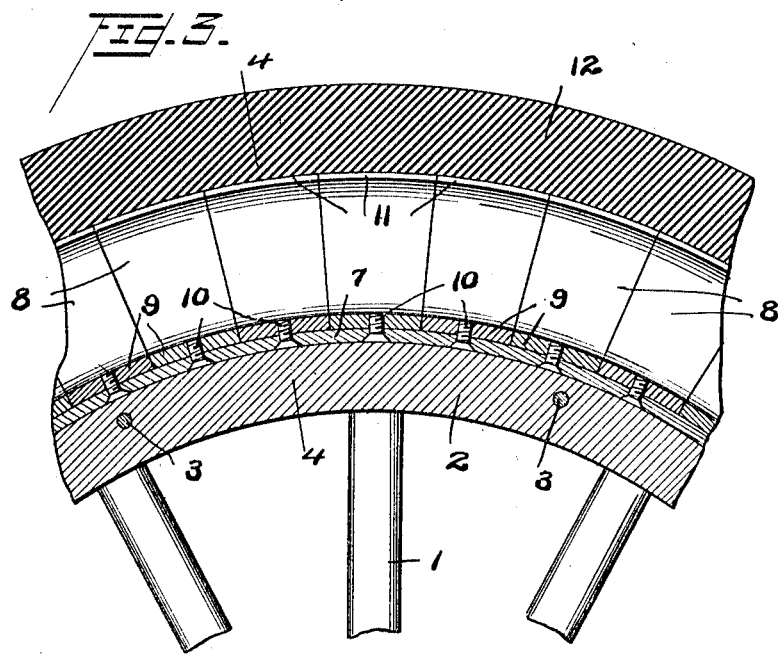
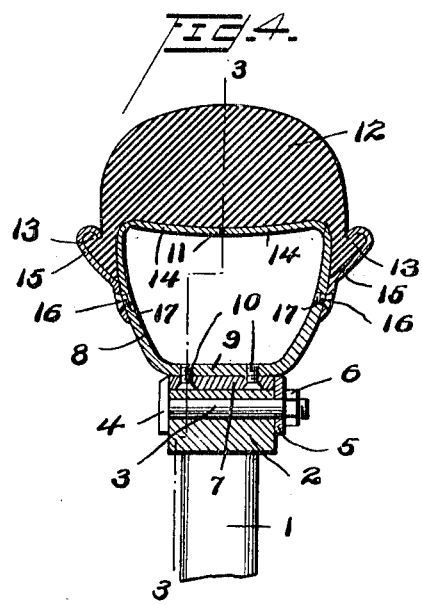
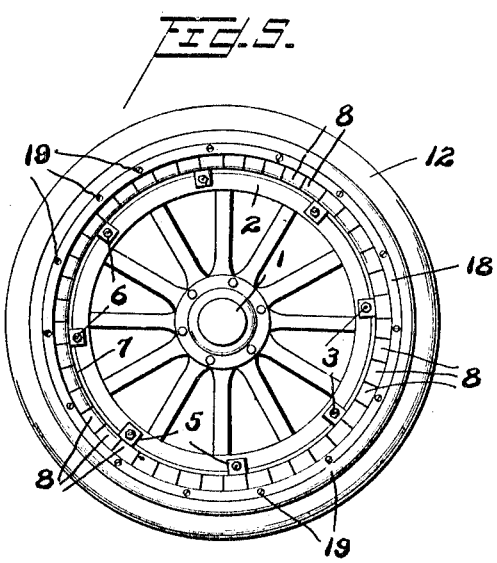
Inventor
Henry J. Augustine
Witnesses
By Joshua R. H. Potts.
Attorney

UNITED STATES PATENT OFFICE.

HENRY J. AUGUSTINE, OF INDEPENDENCE, KANSAS, ASSIGNOR OF ONE-HALF TO ROYAL S. LITCHFIELD, OF INDEPENDENCE, KANSAS.

SPRING-TIRE.

1,117,472. Specification of Letters Patent. Patented Nov. 17, 1914.

Application filed May 9, 1914. Serial No. 837,503.

*To all whom it may concern:*

Be it known that I, HENRY J. AUGUSTINE, a subject of the Emperor of Germany, residing at Independence, in the county of Montgomery and State of Kansas, have invented certain new and useful Improvements in Spring-Tires, of which the following is specification.

My invention relates to improvements in spring tires, the object of the invention being to provide an improved construction of spring tire which can be secured upon any ordinary wheel felly, and which will elastically support and cushion the load.

A further object is to provide a spring tire consisting of a circular series of springs, all of the springs secured at their inner ends to a ring, and at their outer ends supporting a rubber tread portion covering the outer portions of the springs and having beads at the edges which are clamped to each of the springs.

A further object is to provide an improved construction of spring which elastically sustains the pressure upon the tread, said spring so constructed as to compel the same throughout its entire side portions to coöperate in giving the necessary elasticity and also giving the maximum of strength and durability to the tire.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improvements. Fig. 2 is a perspective view of one of the springs. Fig. 3 is a fragmentary view in longitudinal section on the line 3—3 of Fig. 4. Fig. 4 is a view in transverse section on the line 4—4 of Fig. 3, and Fig. 5 is a view in side elevation illustrating a modification.

1 represents an ordinary wheel having a felly 2 through which bolts 3 are projected. The bolts 3 have heads 4, at one end, and clamping plates 5 at their other ends secured by nuts 6 so as to effectually clamp a metal ring 7 around the felly. Around the ring 7, I secure a circular series of radially positioned springs 8. Each spring is composed of a single piece of spring metal having a relatively flat intermediate portion 9 secured by screws 10 to the ring 7. The end portions of the spring curve outwardly and apart, and then curve sharply inwardly. The ends of the spring abut against each other as shown at 11, forming a bearing surface to receive the rubber tread portion 12, which extends entirely around the tire. The springs 8 are thickest at their central portions and gradually become thinner, and hence more elastic toward both ends. The springs are narrowest at their central portion and increase in width to their outer portions so as to compensate for the different arcs of the inner and outer portions of the assembled springs, so that the springs will fit snugly together, and yet operate in unison or singly in sustaining the load.

The inwardly projecting ends of the springs where they abut, are curved transversely so that they form a circular bearing surface concentric with the ring and provide a continuous smooth bearing surface for the tread. This curvature of the ends gradually changes into a straight line at the bend of the metal, the shape being shown most clearly in Figs. 2 and 3. The reason for this particular shape is to allow the tread a smooth surface and to prevent sharp cutting edges at the juncture of the springs. Furthermore, this shape of the spring ends renders such spring ends more or less rigid to prevent them from being collapsed inwardly by the pressure on the tread, and hence compels the springs, throughout their side portions, to sustain the strains and give the necessary resiliency to the tire. By bringing the ends 14 together, any pressure upon the tire tends to spread the side portions of the spring apart, and prevents any possibility of collapsing the springs. As these side portions gradually increase in thickness, it will be observed that increasing strains and stresses are properly cared for, as the springs will be made strong enough for any ordinary purpose. The tread portion 12 is provided throughout its side edges with beads 13, and the springs 8 have clips 15 secured thereto by countersunk screws 16. These clips 15 conform to the shape of the beads 13, and clamp over the same, holding the tread portion 12 securely on the springs. Each spring is provided at opposite sides with clips 15, and with screw-threaded openings 17 to receive the screws 16. Instead of providing each spring with a pair of these clips, I may secure the tread portion by means of rings 18 secured by screws 19 to the springs as clearly shown in Fig. 5.

Various slight changes might be made in the general form and arrangement of parts described without departing from my invention, and hence I do not limit myself to the precise details set forth, but consider myself at liberty to make such changes and alterations as fairly fall within the spirit and scope of the appened claims.

Having thus described my invention, what I claim as new and desire to secure by Letters Patent is:

1. A spring tire, comprising a ring, a circular series of radially positioned springs secured intermediate their ends to said ring, and at their ends curving outwardly and then inwardly, the inwardly projecting ends of all the springs located close together, side by side, with the pair of ends of each spring having their extremities together and in alinement, a removable tread portion located around all of the springs and fitting against the bearing surface formed by said inwardly projecting ends, said tread having beads at its edges projecting over the sides of the springs, and means clamping the beads to the springs, substantially as described.

2. A spring tire, comprising a ring, a circular series of radially positioned springs secured intermediate their ends to said ring, and at their ends curving outwardly and then inwardly, the inwardly projecting ends of said springs abutting and forming a bearing surface, a removable tread portion located around all of the springs and fitting against the bearing surfaces thereof, said tread having beads at its edges projecting over the sides of the springs, clips at opposite sides of each spring engaging over the bead portions of the tread, and screws in said clips engaging in threaded openings in the sides of the springs holding the clips, substantially as described.

In testimony whereof I have signed my name to this specification in the presence of two subscribing witnesses.

HENRY J. AUGUSTINE.

Witnesses:
M. E. DITTUS,
CHAS. E. POTTS.

Copies of this patent may be obtained for five cents each, by addressing the "Commissioner of Patents. Washington, D. C."